US010144291B2

(12) United States Patent
Ferguson

(10) Patent No.: US 10,144,291 B2
(45) Date of Patent: Dec. 4, 2018

(54) CONTINUOUS VOLTAGE CONTROL OF A TRANSPORT REFRIGERATION SYSTEM

(71) Applicant: Carrier Corporation, Farmington, CT (US)

(72) Inventor: Benjamin Edward Ferguson, Cazenovia, NY (US)

(73) Assignee: CARRIER CORPORATION, Farmington, CT (US)

(*) Notice: Subject to any disclaimer, the term of this patent is extended or adjusted under 35 U.S.C. 154(b) by 6 days.

(21) Appl. No.: 15/355,470

(22) Filed: Nov. 18, 2016

(65) Prior Publication Data
US 2017/0144548 A1 May 25, 2017

Related U.S. Application Data

(60) Provisional application No. 62/259,265, filed on Nov. 24, 2015.

(51) Int. Cl.
B60L 1/02 (2006.01)
B60H 1/32 (2006.01)
(Continued)

(52) U.S. Cl.
CPC .............. B60L 1/02 (2013.01); B60H 1/3211 (2013.01); B60H 1/3226 (2013.01);
(Continued)

(58) Field of Classification Search
CPC .. B60L 1/02; B60L 2240/421; B60L 2260/42; B60H 1/3211; B60H 1/3226; B60H 2001/3292
(Continued)

(56) References Cited

U.S. PATENT DOCUMENTS 3,609,989 A * 10/1971 Richardson ............. F25B 1/053
62/182
5,275,012 A * 1/1994 Dage .................. B60H 1/00392
219/202
(Continued)

FOREIGN PATENT DOCUMENTS

EP 1790921 A1 5/2007
WO 2009091396 A1 7/2009
WO 2013188888 A1 12/2013

OTHER PUBLICATIONS

European Search Report for application EP 16200301.6, dated Jun. 8, 2017, 8 pgs.

Primary Examiner — Atul Trivedi
(74) Attorney, Agent, or Firm — Cantor Colburn LLP

(57) ABSTRACT

A method of operating a transport refrigeration system is provided. The method includes controlling, using a controller, a first plurality of components of a refrigeration unit, wherein controlling comprises operating a prime mover and an electric generation device. The method also includes operating, using a controller, the prime mover at a selected high speed. The method further includes monitoring, using a controller, a plurality of operating parameters of the refrigeration unit, wherein at least one of the operating parameters is at least one of a voltage of the electric generation device and a speed of the prime mover. The method yet further includes comparing, using a controller, the voltage of the electric generation device to a selected voltage. The method also includes comparing, using a controller, the speed of the prime mover to a selected speed.

12 Claims, 2 Drawing Sheets

(51) Int. Cl.
*H02P 9/04* (2006.01)
*H02P 9/48* (2006.01)

(52) U.S. Cl.
CPC ............ *B60H 1/3232* (2013.01); *H02P 9/04* (2013.01); *H02P 9/48* (2013.01); *B60H 2001/3292* (2013.01); *B60L 2240/421* (2013.01); *B60L 2260/42* (2013.01)

(58) Field of Classification Search
USPC .......................................................... 701/22
See application file for complete search history.

(56) References Cited

U.S. PATENT DOCUMENTS

| | | |
|---|---|---|
| 5,504,417 A | 4/1996 | Kern et al. |
| 5,557,938 A | 9/1996 | Hanson et al. |
| 6,044,651 A | 4/2000 | Reason et al. |
| 6,148,627 A | 11/2000 | Reason et al. |
| 6,196,012 B1 | 3/2001 | Reason et al. |
| 6,226,998 B1 | 5/2001 | Reason et al. |
| 8,487,458 B2 | 7/2013 | Steele et al. |
| 8,756,947 B2 | 6/2014 | Chen et al. |
| 9,085,218 B2 | 7/2015 | Awwad |
| 2002/0108388 A1 | 8/2002 | Wilson et al. |
| 2003/0000236 A1* | 1/2003 | Anderson ............... F25B 27/00 62/228.3 |
| 2008/0087029 A1 | 4/2008 | Renken et al. |
| 2008/0115512 A1* | 5/2008 | Rizzo ................. B60H 1/00428 62/134 |
| 2011/0067422 A1* | 3/2011 | Ichishi ................. B60H 3/0085 62/176.1 |
| 2013/0283826 A1* | 10/2013 | Burnham ................ B60K 1/00 62/56 |
| 2014/0026599 A1* | 1/2014 | Rusignuolo ........... F25B 49/025 62/56 |
| 2014/0060796 A1* | 3/2014 | Ichishi ............... B60H 1/00864 165/204 |
| 2014/0157818 A1 | 6/2014 | Burchill |
| 2014/0283533 A1 | 9/2014 | Kurtzman et al. |
| 2015/0252805 A1 | 9/2015 | Burnham et al. |
| 2015/0274056 A1 | 10/2015 | Olaleye |
| 2017/0203632 A1* | 7/2017 | Westendarp ....... B60H 1/00378 |

\* cited by examiner

CONTINUOUS VOLTAGE CONTROL OF A TRANSPORT REFRIGERATION SYSTEM

CROSS-REFERENCE TO RELATED APPLICATIONS

This application claims the benefit of U.S. provisional patent application Ser. No. 62/259,265, filed Nov. 24, 2015, the entire contents of which are incorporated herein by reference.

BACKGROUND OF THE DISCLOSURE

The embodiments herein generally relate to "all electric" transport refrigeration systems and the continuous voltage control of such systems.

Refrigerated trucks and trailers are commonly used to transport perishable cargo, such as, for example, produce, meat, poultry, fish, dairy products, cut flowers, and other fresh or frozen perishable products. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "all electric" transport refrigeration system for a refrigerated trailer application is also commercially available through Carrier Corporation headquartered in Farmington, Conn., USA. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

In some all electric transport refrigeration systems, when operating in a cold weather environment the prime mover will move to high speed to cool the cargo compartment, but if the generator voltage is over a max voltage limit the prime mover will move back down to low speed. The prime mover will cycle back to high speed when additional cooling is needed in the cargo compartment. The continually cycling of the prime mover between high speed and low speed is inefficient.

BRIEF DESCRIPTION OF THE DISCLOSURE

According to one embodiment, a method of operating a transport refrigeration system is provided. The method includes controlling, using a controller, a first plurality of components of a refrigeration unit, wherein controlling comprises operating a prime mover and an electric generation device. The method also includes operating, using a controller, the prime mover at a selected high speed. The method further includes monitoring, using a controller, a plurality of operating parameters of the refrigeration unit, wherein at least one of the operating parameters is at least one of a voltage of the electric generation device and a speed of the prime mover. The method yet further includes comparing, using a controller, the voltage of the electric generation device to a selected voltage. The method also includes comparing, using a controller, the speed of the prime mover to a selected speed.

In addition to one or more of the features described above, or as an alternative, further embodiments may include the controller continues operating the prime mover at the selected high speed when the voltage of the electric generation device does not exceed a voltage limit for a first selected time period.

In addition to one or more of the features described above, or as an alternative, further embodiments may include the controller taking a corrective action when the voltage of the electric generation device exceeds a voltage limit for a first selected time period.

In addition to one or more of the features described above, or as an alternative, further embodiments may include the controller operating the prime mover at a selected low speed and the controller initiating a continuous voltage control cycle mode.

In addition to one or more of the features described above, or as an alternative, further embodiments may include the controller operating the prime mover at an increasing rate of speed until the voltage of the electric generation device equals a selected voltage.

In addition to one or more of the features described above, or as an alternative, further embodiments may include the controller exiting the continuous voltage control cycle when the speed of the prime mover equals the selected high speed and the voltage of the electric generation device equals the selected voltage.

In addition to one or more of the features described above, or as an alternative, further embodiments may include the controller taking a second corrective action when the speed of the prime mover is not equal to the selected high speed and the voltage of the electric generation device equals the selected voltage.

In addition to one or more of the features described above, or as an alternative, further embodiments may include the controller reinitiating the continuous voltage control cycle when after a second selected time period, the voltage of the electric generation device is lower than the selected voltage.

In addition to one or more of the features described above, or as an alternative, further embodiments may include the controller exiting the continuous voltage control cycle and continuing to operate the prime mover at the current speed when after a second selected time period, the voltage of the electric generation device is not lower than the selected voltage.

According to another embodiment, a transport refrigeration system includes a prime mover. Also included is an electric generation device powered by the prime mover and providing an electric output. Further included is a first refrigeration unit electrically powered by the electric output of the electric generation device. Yet further included a controller in operative communication with the prime mover, the electric generation device, and the refrigeration unit wherein the controller compares a voltage of the electric generation device to a selected voltage and a speed of the prime mover to a selected speed, wherein the controller operates the prime mover at a selected high speed.

In addition to one or more of the features described above, or as an alternative, further embodiments may include the controller continues to operate the prime mover at the selected high speed when the voltage of the electric generation device does not exceed a voltage limit for a first selected time period.

In addition to one or more of the features described above, or as an alternative, further embodiments may include the controller takes a corrective action when the voltage of the electric generation device exceeds a voltage limit for a first selected time period.

In addition to one or more of the features described above, or as an alternative, further embodiments may include the controller operates the prime mover at a selected low speed and the controller initiates a continuous voltage control cycle mode.

In addition to one or more of the features described above, or as an alternative, further embodiments may include the controller operates the prime mover at an increasing rate of speed until the voltage of the electric generation device equals a selected voltage.

In addition to one or more of the features described above, or as an alternative, further embodiments may include the controller exits the continuous voltage control cycle when the speed of the prime mover equals the selected high speed and the voltage of the electric generation device equals the selected voltage.

In addition to one or more of the features described above, or as an alternative, further embodiments may include the controller takes a second corrective action when the speed of the prime mover is not equal to the selected high speed and the voltage of the electric generation device equals the selected voltage.

In addition to one or more of the features described above, or as an alternative, further embodiments may include the controller reinitiates the continuous voltage control cycle when after a second selected time period, the voltage of the electric generation device is lower than the selected voltage.

In addition to one or more of the features described above, or as an alternative, further embodiments may include the controller exits the continuous voltage control cycle and continues to operate the prime mover at the current speed when after a second selected time period the voltage of the electric generation device is not lower than the selected voltage.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
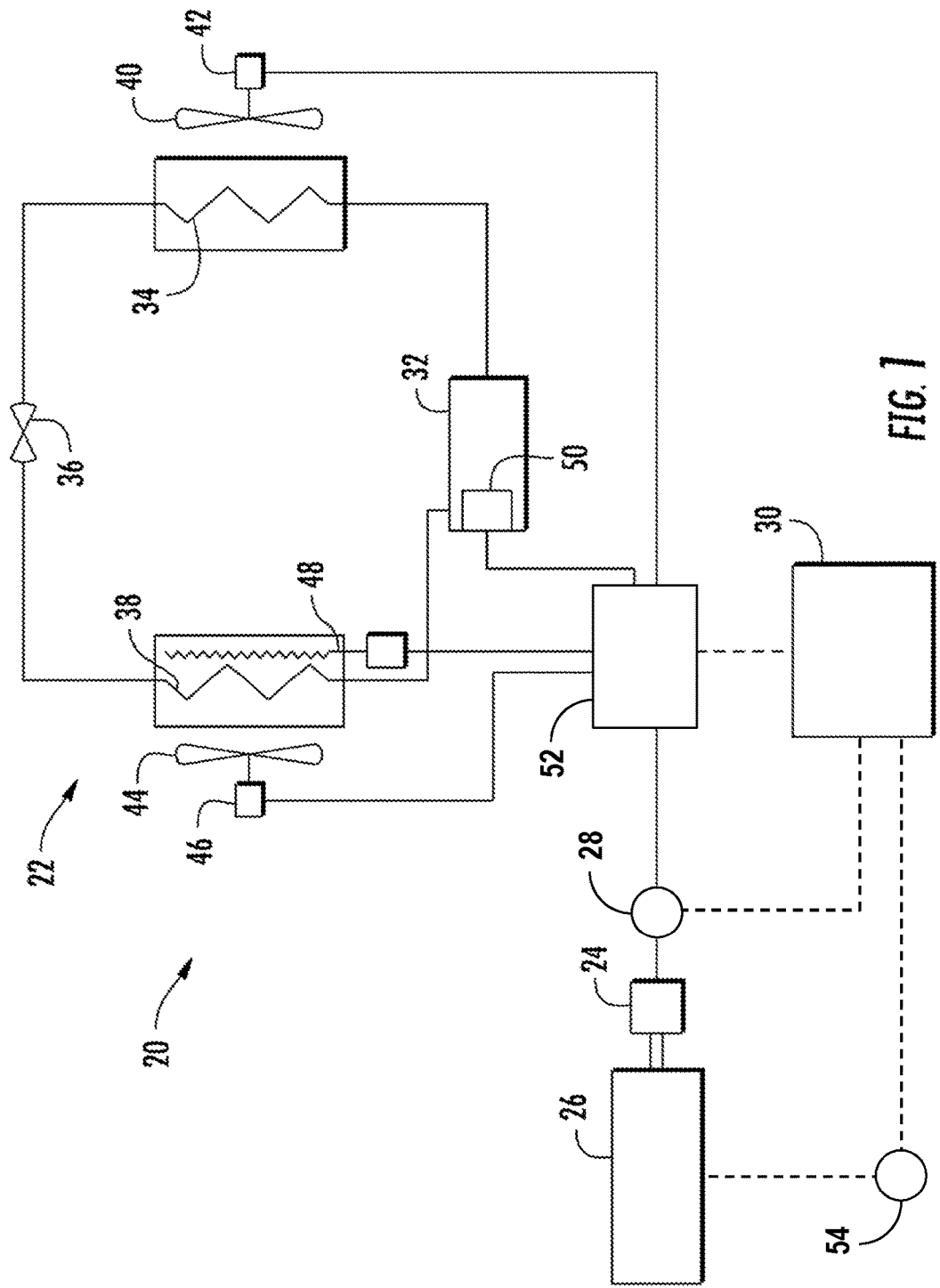
FIG. 1 is a schematic illustration of a transport refrigeration system in accordance with the disclosure.

Referring to FIG. 1, a transport refrigeration system 20 includes a refrigeration unit 22, an electric generation device 24, a prime mover 26 for driving the electric generation device 24, and a controller 30. The refrigeration unit 22 functions, under the control of the controller 30, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo box of the truck or trailer, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric heater 48. The controller 30 may also be also to selectively operate the prime mover 26, typically through an electronic engine controller 54 operatively associated with the prime mover 26.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger.

The prime mover 26, which comprises an on-board fossil-fuel engine, most commonly a diesel engine, drives the electric generation device 24 that generates electrical power. The drive shaft of the engine drives the shaft of the electric generation device 24. In an electrically powered embodiment of the transport refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate.

Figure 2:
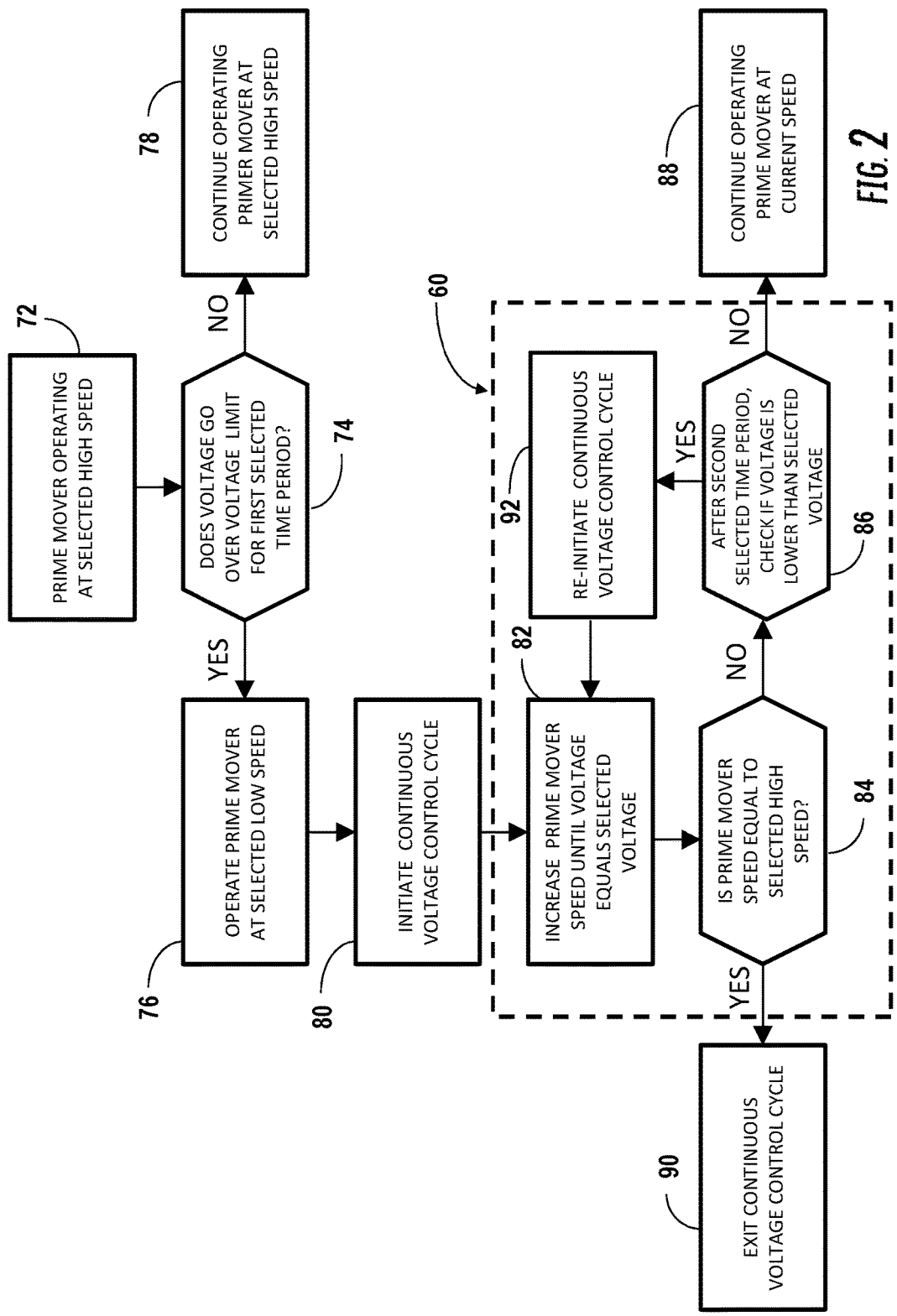
FIG. 2 is a flow diagram illustrating a method of operating a refrigeration system.

Current all-electric refrigeration units have a generator voltage limitation when operating in cold environments. On current systems, once the refrigeration unit has met all the system parameters, the unit will attempt to move the engine to high speed, but if the generator voltage is over a voltage limit for a short period, the unit will move back to low speed. The refrigeration system 20 has a voltage sensor 28 to sense the voltage of the electric generation device 24. During cold ambient operation, the refrigeration system 20 controls the speed of the prime mover 26 to maintain the output of the electric generation device 24 below a voltage limit. As the unit warms up and the voltage output of electric generation device 24 decreases, the speed of the prime mover 26 will be increased and remain at an increased level to boost the heating or cooling capability, instead of returning back to low speed. The prime mover 26 will maintain a speed such that a selected voltage (near the voltage limit) of the electric generation device 24 is not exceeded. This process is called a continuous voltage control cycle 60 as illustrated in FIG. 2 and discussed below. Controlling the speed of the prime mover 26 such that the output of the electric generation device 24 does not exceed a voltage limit prevents the prime mover from cycling low speed to high speed, and back down to low speed due to an over-voltage condition at the electric generation device 24.

Referring now to FIG. 2, a method of operating the transport refrigeration system is illustrated. As described herein, the method relies upon the controller 30 described above for monitoring and controlling the processes associated with operation of the transport refrigeration system 20. The controller 30 is in operative communication with the prime mover 26, the electric generation device 24, and the refrigeration unit 22. The method includes operating the prime mover 26 and the electric generation device 24 with the controller 30. The controller 30 also monitors operational parameters of the refrigeration unit 22 including at least one of a voltage of the electric generation device 24 and a speed of the prime mover 26. The controller 30 compares a voltage of the electric generation device 24 to a selected voltage and a speed of the prime mover 26 to a selected speed.

In order to initiate cooling of a refrigerated cargo space, the method includes the controller 30 operating the prime mover 26 at a selected high speed at 72 to rapidly cool the refrigerated cargo space. The controller 30 continues operating the prime mover 26 at the selected high speed at 78 when the voltage of the electric generation device 24 does not exceed a voltage limit for a first selected time period at 74. In an exemplary embodiment, the voltage limit of the electric generation device 24 is equal to 600 volts. In an exemplary, the first selected time period is equal to 60 seconds.

If the voltage of the electric generation device 24 exceeds the voltage limit for the first selected time period at 74, the controller 30 takes a corrective action at 76. At 76, the controller 30 operates the prime mover 26 at a selected low speed and the controller 30 initiates, at 80, a continuous voltage control cycle 60. The continuous voltage control cycle 60 includes the controller 30 operating the prime mover 26 at an increasing rate of speed until the voltage of the electric generation device 24 equals a selected voltage at 82. In a further embodiment, the selected voltage may be equal to 590 volts, which is lower than the voltage limit, e.g., 600 volts. The continuous voltage cycle 60 further includes the controller 30 exiting the continuous voltage control cycle 60 at 90 when the speed of the prime mover 26 equals a selected high speed and the voltage of the electric generation device 24 equals the selected voltage at 84. Block 90 indicates that the prime mover has reached the selected high speed and not exceeded the voltage limit. If, at 84, the speed of the prime mover 26 is not equal to the selected high speed, flow proceeds to 86 where the controller 30, after a second selected time period, determines if the voltage of the electric generation device 24 is lower than the selected voltage. If the voltage of the electric generation device 24 is not lower than the selected voltage, flow proceeds to 88 where the controller continues to operate the prime mover 26 at the current speed.

If, after the second selected time period, the voltage of the electric generation device 24 is lower than the selected voltage at 86, flow proceeds to 92 where the controller 30 reinitiates the continuous voltage control cycle 60. Flow proceeds to 82 where the speed of the prime mover is again increased until the voltage output of the electric generation device 24 is at the selected voltage. The process continues until either the voltage output of the electric generation device 24 is at the selected voltage (at 88) or the prime mover 26 has reached the selected high speed (at 90).

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a transport refrigeration system comprising:
    controlling, using a controller, a first plurality of components of a refrigeration unit, wherein controlling comprises operating a prime mover and an electric generation device;
    operating, using a controller, the prime mover at a selected high speed;
    monitoring, using a controller, a plurality of operating parameters of the refrigeration unit, wherein at least one of the operating parameters is at least one of a voltage of the electric generation device and a speed of the prime mover;
    comparing, using a controller, the voltage of the electric generation device to a selected voltage; and
    comparing, using a controller, the speed of the prime mover to a selected speed;
    the controller taking a corrective action when the voltage of the electric generation device exceeds a voltage limit for a first selected time period, wherein the corrective action comprises the controller operating the prime mover at a selected low speed and the controller initiating a continuous voltage control cycle mode, wherein the continuous voltage control cycle comprises the controller operating the prime mover at an increasing rate of speed until the voltage of the electric generation device equals the selected voltage.

2. The method of claim 1, further comprising:
    the controller operating the prime mover at the selected high speed when the voltage of the electric generation device does not exceed a voltage limit for a first selected time period.

3. The method of claim 1, wherein the continuous voltage control cycle further includes:
    the controller exiting the continuous voltage control cycle when the speed of the prime mover equals the selected high speed and the voltage of the electric generation device equals the selected voltage.

4. The method of claim 1, wherein the continuous voltage control cycle further includes:
    the controller taking a second corrective action when the speed of the prime mover is not equal to the selected high speed and the voltage of the electric generation device equals the selected voltage.

5. The method of claim 4, wherein the second corrective action comprises:
    the controller reinitiating the continuous voltage control cycle when after a second selected time period, the voltage of the electric generation device is lower than the selected voltage.

6. The method of claim 4, wherein the second corrective action comprises:
    the controller exiting the continuous voltage control cycle and continuing to operate the prime mover at the current speed when after a second selected time period, the voltage of the electric generation device is not lower than the selected voltage.

7. A transport refrigeration system comprising:
    a prime mover;
    an electric generation device powered by the prime mover and providing an electric output;
    a refrigeration unit electrically powered by the electric output of the electric generation device; and
    a controller in operative communication with the prime mover, the electric generation device, and the refrigeration unit,
    wherein the controller compares a voltage of the electric generation device to a selected voltage and a speed of the prime mover to a selected speed,
    wherein the controller operates the prime mover at a selected high speed;
    wherein the controller takes a corrective action when the voltage of the electric generation device exceeds a voltage limit for a first selected time period, wherein the corrective action comprises the controller operates the prime mover at a selected low speed and the controller initiates a continuous voltage control cycle mode, wherein the continuous voltage control cycle comprises the controller operates the prime mover at an increasing rate of speed until the voltage of the electric generation device equals a selected voltage.

8. The transport refrigeration system of claim 7, wherein:
    the controller continues to operate the prime mover at the selected high speed when the voltage of the electric generation device does not exceed a voltage limit for a first selected time period.

9. The transport refrigeration system of claim 7, wherein the continuous voltage control cycle further includes:
    the controller exits the continuous voltage control cycle when the speed of the prime mover equals the selected high speed and the voltage of the electric generation device equals the selected voltage.

10. The transport refrigeration system of claim 7, wherein the continuous voltage control cycle further comprises:

the controller takes a second corrective action when the speed of the prime mover is not equal to the selected high speed and the voltage of the electric generation device equals the selected voltage.

11. The transport refrigeration system of claim 10, wherein the second corrective action further comprises:
the controller reinitiates the continuous voltage control cycle when after a second selected time period, the voltage of the electric generation device is lower than the selected voltage.

12. The transport refrigeration system of claim 10, wherein the second corrective action further comprises:
the controller exits the continuous voltage control cycle and continues to operate the prime mover at the current speed when after a second selected time period the voltage of the electric generation device is not lower than the selected voltage.

* * * * *